United States Patent
Li et al.

(10) Patent No.: US 10,085,273 B2
(45) Date of Patent: Sep. 25, 2018

(54) METHOD AND DEVICE FOR TRANSMITTING ENHANCED TRANSMISSION SELECTION STANDARD CONFIGURATION INFORMATION

(71) Applicant: ZTE Corporation, Shenzhen (CN)

(72) Inventors: Xilong Li, Shenzhen (CN); Xiangrang Zhang, Shenzhen (CN); Shuling Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 201 days.

(21) Appl. No.: 14/769,501

(22) PCT Filed: Sep. 23, 2013

(86) PCT No.: PCT/CN2013/083962
§ 371 (c)(1),
(2) Date: Aug. 21, 2015

(87) PCT Pub. No.: WO2014/127635
PCT Pub. Date: Aug. 28, 2014

(65) Prior Publication Data
US 2016/0007366 A1 Jan. 7, 2016

(30) Foreign Application Priority Data
Feb. 22, 2013 (CN) .......................... 2013 1 0056990

(51) Int. Cl.
*H04W 72/04* (2009.01)
*H04W 72/10* (2009.01)
(Continued)

(52) U.S. Cl.
CPC ........... *H04W 72/10* (2013.01); *H04L 41/085* (2013.01); *H04L 47/20* (2013.01); *H04L 47/58* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 7,514,712 B2 * 4/2009 Araki ................ G02F 1/136227
257/59
7,580,403 B2 * 8/2009 Frattura .............. H04M 3/4872
370/352
(Continued)

FOREIGN PATENT DOCUMENTS

CN 102315970 A 1/2012
CN 102739505 A 10/2012
(Continued)

OTHER PUBLICATIONS

Supplemental European Search Report of EP Application No. 13875912.1-1862/2874361 PCT/CN2013083962, dated Jul. 24, 2015.
(Continued)

*Primary Examiner* — Hassan Phillips
*Assistant Examiner* — Prenell Jones
(74) *Attorney, Agent, or Firm* — Banner & Witcoff, Ltd.

(57) ABSTRACT

A method and a device for transmitting enhanced transmission selection (ETS) standard configuration information. The receiving method includes: receiving LLDP packets, wherein, the LLDP packets are in an ETS recommended TLV format; analyzing a first field in the LLDP packets, and determining whether the value of each byte in the first field is in a preset range or not; analyzing the value of a first segment of bits of each byte in the first field when determining that the value of each byte in the first field is in the preset range, and determining a scheduling algorithm used by internal priorities of a traffic class corresponding to each byte in the first field according to the values of the first segment of bits; and analyzing value of a second segment of bits of each byte in the first field, and determining an additional parameter corresponding to the priority.

14 Claims, 2 Drawing Sheets

(51) Int. Cl.
*H04L 12/24* (2006.01)
*H04L 12/869* (2013.01)
*H04L 12/813* (2013.01)
*H04L 29/06* (2006.01)
*H04L 12/863* (2013.01)

(52) U.S. Cl.
CPC ............ *H04L 69/22* (2013.01); *H04L 47/623* (2013.01); *Y02D 30/30* (2018.01)

(56) References Cited

U.S. PATENT DOCUMENTS

| | | | |
|---|---|---|---|
| 7,593,999 B2 | 9/2009 | Nathanson | |
| 8,201,005 B2* | 6/2012 | Wertheimer | G06F 1/3203 370/311 |
| 8,233,474 B2* | 7/2012 | Heath | H04W 4/02 370/352 |
| 8,279,788 B2* | 10/2012 | Diab | H04L 12/12 370/311 |
| 8,402,120 B1* | 3/2013 | Perkinson | H04L 67/16 370/254 |
| 8,443,065 B1* | 5/2013 | White | H04L 12/4625 370/254 |
| 9,007,909 B2* | 4/2015 | Jain | H04L 47/724 370/235 |
| 9,026,812 B2* | 5/2015 | Ravindranath | H04L 12/12 713/310 |
| 9,160,565 B2* | 10/2015 | Shukla | H04L 12/462 |
| 9,191,278 B2* | 11/2015 | Schlichter | H04L 63/0227 |
| 9,225,671 B2* | 12/2015 | Goyal | H04L 49/70 |
| 2005/0195756 A1 | 9/2005 | Frattura | |
| 2007/0110360 A1 | 5/2007 | Stanford | |
| 2013/0058254 A1* | 3/2013 | Chawla | H04L 12/28 370/254 |
| 2014/0064286 A1* | 3/2014 | K.S. | H04L 12/4679 370/395.53 |

FOREIGN PATENT DOCUMENTS

| | | |
|---|---|---|
| RU | 2204215 C2 | 5/2003 |
| RU | 2323429 C2 | 4/2008 |
| RU | 2468524 C2 | 11/2012 |
| WO | 2009/032436 A1 | 3/2009 |

OTHER PUBLICATIONS

IEEE Standard for Local and Metropolitan area networks—Media Access Control (MAC) Bridges and Virtual Bridged Local Area Networks—Amendment 18: Enhanced Transmission Selection for Bandwidth Sharing between Traffic Classes, Sep. 30, 2011, 110 pages.
Reinemo S et al, Ethernet for High-Performance Data Centers: On the New IEEE Datacenter Bridging Standards, IEEE Micro, IEEE Service Center, Jul. 1, 2010, 10 pages.
Lama, Victor, Understanding Enhanced Transmission Selection IEEE 802, 1Qaz, Apr. 8, 2012, 8 pages.
International Search Report of PCT/CN2013/083962 dated Dec. 26, 2013.
Lama, Victor, Understanding Enhanced Transmission Selection IEEE 802, 1Qaz [online], Apr. 8, 2012 [retrieved on Nov. 26, 2013]. Retrieved from the Internet; URL; http://en.community.dell.com/tecjcemter/extras/m>page 7, paragraph 0001 to p. 8, the last paragraph.

* cited by examiner

METHOD AND DEVICE FOR TRANSMITTING ENHANCED TRANSMISSION SELECTION STANDARD CONFIGURATION INFORMATION

TECHNICAL FIELD

The present document relates to the field of communications, and more particularly, to a method and device for transmitting enhanced transmission selection (referred to as ETS) configuration information.

BACKGROUND

Data center is a center providing enterprise application business services, and is a center of data operations, exchange and storage. It integrates advanced network and storage technologies, carries more than 80% of service requests and data storage capacity of the network, and provides a service and operating platform for the healthy functioning of the customer service system.

In order to integrate the intranet and Ethernet, the concept of enhanced Ethernet is proposed. The enhanced Ethernet allows dividing different services, so that not only the needs of ordinary Ethernet but also the needs of the data center network can be met.

In the enhanced Ethernet, DCBX (Data Center Bridging Exchange Protocol) specifies auto-discovery and capability exchange protocol applied in the DCB (Data Center Bridging) device, and the DCB device applied in data center environments uses the protocol to directly exchange configuration information with the peer device which is directly connected with it, so as to configure the peer end device with the DCB function in the case that the peer end device allows. The protocol can also be used to detect non-matching configuration and configure the peer end device which is directly connected with it.

The DCBX function is not a new technology, it is an extension of the LLDP OUI TLV field, wherein LLDP is the Link Layer Discovery Protocol, OUI is the Organizationally Unique Identifier and TLV is the Type-Length-Value, in IEEE 802.1AB by the data center protocol, and carried in the LLDP packet for transmission.

The ETS is an improvement and enhancement of transmission selection entity capability of the output port. The ETS provides an operating model of priority processing and bandwidth allocation in the data center environment, through the use of ETS, different types of services such as LAN (Local Area Network), storage, clustering and management are divided into different traffic classes (referred to as TC) and provided with appropriate bandwidth allocation or best-effort services.

Each traffic class may comprise one or more priorities, all priorities which belong to the same traffic class share the bandwidth allocated to the traffic class, if the actually utilized bandwidth of the group is less than the bandwidth allocated to it, the idle bandwidth can be temporarily occupied by other traffics. Each traffic class can have its own priority queue scheduling algorithm. When using the DCBX to send the local-end ETS configuration, the standard provides two TLVs, one is configured TLV (Table 1) and the other is recommended TLV (Table 2). Wherein, the recommended TLV is configuration recommended to the peer end, and expects the peer end to configure the local device according to the current recommended configuration. The division of each traffic class in a packet, bandwidth information and scheduling algorithm can refer to Table 3, and each TC in Table 3 corresponds to 8 bits and is used to indicate the transmission selection algorithm used by the TC. Table 4 is a transmission selection algorithm description table.

TABLE 1

| ETS configured TLV format | | | | | | | | | | |
|---|---|---|---|---|---|---|---|---|---|---|
| TLV type = 127 | TLV information string-length = 25 | 802.1 OUI 00-80-c2 | 802.1 subtype = 9 | Willing | CB-S | Reserved | Max TCs | Priority assignment table | TC bandwidth table | Transmission selection algorithm (TSA) assignment table |
| 7 bits | 9 bits | 3 octets | 1 octet | 1 bit | 1 bit | 3 bit | 3 bit | 4 octets | 8 octets | 8 octets |
| TLV header | | | | TLV information string length = 25 bytes | | | | | | |

The Willing bit in Table 1 indicates whether the local end is willing to accept the configuration of the peer end or not; the CBS bit indicates whether the device supports the Credit-based shaper scheduling algorithm or not; Max TCs indicates the maximum number of TCs that can be supported by the device.

TABLE 2

| ETS recommended TLV format | | | | | | | | |
|---|---|---|---|---|---|---|---|---|
| TLV type = 127 | TLV information string-length = 25 | 802.1 OUI 00-80-c2 | 802.1 subtype = 10 | Reserved | Priority assignment table | TC bandwidth table | Transmission selection algorithm (TSA) assignment table |
| 7 bits | 9 bits | 3 octets | 1 octet | 8 bits | 4 octets | 8 octets | 8 octets |
| TLV header | | | | TLV information string length = 25 bytes | | | |

TABLE 3a

Priority assignment table

| Byte | | | | | | | | | | | | | | | |
|---|---|---|---|---|---|---|---|---|---|---|---|---|---|---|---|
| 1 | | | | 2 | | | | 3 | | | | 4 | | | |
| Priority 0 | | Priority 1 | | Priority 2 | | Priority 3 | | Priority 4 | | Priority 5 | | Priority 6 | | Priority 7 | |
| Bit 7 | 4 | 3 | 0 | 7 | 4 | 3 | 0 | 7 | 4 | 3 | 0 | 7 | 4 | 3 | 0 |

TABLE 3b

TC Bandwidth Table

| Byte | | | | | | | |
|---|---|---|---|---|---|---|---|
| 1 | 2 | 3 | 4 | 5 | 6 | 7 | 8 |
| TC % 0 | TC % 1 | TC % 2 | TC % 3 | TC % 4 | TC % 5 | TC % 6 | TC % 7 |

TABLE 3c

TSA Assignment Table

| Byte | | | | | | | |
|---|---|---|---|---|---|---|---|
| 1 | 2 | 3 | 4 | 5 | 6 | 7 | 8 |
| Traffic Class 0 | Traffic Class 1 | Traffic Class 2 | Traffic Class 3 | Traffic Class 4 | Traffic Class 5 | Traffic Class 6 | Traffic Class 7 |

TABLE 4

Transmission selection algorithm description table

| Transmission Selection Algorithm | Identifier |
|---|---|
| Strict priority algorithm (8.6.8.1) | 0 |
| Credit-based shaper scheduling algorithm (8.6.8.2) | 1 |
| Enhanced Transmission Selection Algorithm (8.6.8.3) | 2 |
| Reserved | 3-254 |
| Vendor-specific transmission selection algorithm for DCBX | 255 |
| Vendor specific | a four-byte integer, wherein three most significant bytes hold the OUI value, and the value of the other sub-significant byte is an integer in the range of 0 to 255, and the integer is assigned by the OUI owner |

By analyzing the abovementioned Table 2 to Table 4, it can be found that, since the ETS recommended TLV packet only carries the TC priority and bandwidth information, the protocol can only support priority-based scheduling algorithm, and cannot support guiding the traffic classes of the peer end in using a variety of scheduling algorithms. For other scheduling algorithms, especially those which need to perform weighted scheduling on the respective priorities, they are basically unable to meet the implementation, which likely results in the case that the low-priority queue is starved to death.

SUMMARY

The problem to be solved by the document is to provide a method and device for transmitting enhanced transmission selection configuration information, to support guiding the peer end in using a variety of scheduling algorithms.

To solve the abovementioned technical problem, the present document provides a method for receiving enhanced transmission selection (ETS) configuration information, comprising:

receiving Link Layer Discovery Protocol (LLDP) packets, wherein the LLDP packets use an ETS recommended TLV format;

analyzing a first field in the LLDP packets, judging whether the value of each byte in the first field is within a preset range or not;

when determining that the value of each byte in the first field is within the preset range, analyzing the value of a first segment of bits of each byte in the first field, and judging a scheduling algorithm used by internal priorities of a traffic class corresponding to each byte in the first field according to the value of the first segment of bits;

analyzing the value of a second segment of bits of each byte in the first field, determining an additional parameter corresponding to the priority.

Preferably, the first field is a transmission selection algorithm table field.

Preferably, said judging whether the value of each byte in the first field is within a preset range or not comprises:

considering that the value of each byte in the transmission selection algorithm table field is within a preset range if determining that the value of each byte in the Transport selection algorithm table field meets the following conditions: the value of each byte in the Transmission selection algorithm table field is not equal to 255, and the value of the first segment of bits of each byte in the transmission selection algorithm table field is no less than 3.

Preferably, the first segment of bits of each byte in the transmission selection algorithm table field comprises: five low bits of each byte in the transmission selection algorithm table field.

Preferably, said analyzing the value of the second segment of bits of each byte in the first field to determine an additional parameter corresponding to the priority comprises:

analyzing the value of the second segments of bits of each byte in the transmission selection algorithm table field, and taking its value as a weight of the priority corresponding to each byte.

Preferably, the second segment of bits of each byte in the transmission selection algorithm table field comprises: three high bits of each byte in the transmission selection algorithm table field.

To solve the abovementioned technical problem, the present document further provides a method for transmitting enhanced transmission selection (ETS) configuration information, comprising:

in a process of using an ETS recommended TLV format to generate Link Layer Discovery Protocol (LLDP) packets, determining a scheduling algorithm used by internal priorities of each traffic class, filling the identifier of the scheduling algorithm into the first segment of bits of the byte corresponding to the appropriate traffic class in the first field;

determining an additional parameter corresponding to the respective priority, filling the additional parameter into the second segment of bits of the byte corresponding to the appropriate priority in the first field.

Preferably, the first field is a transmission selection algorithm table field.

Preferably, the range of the identifier of the scheduling algorithm is [3,254].

Preferably, the first segment of bits comprises: 5 low bits; the second segment of bits comprises: 3 high bits.

Preferably, the additional parameter is a weight of the priority.

To solve the abovementioned technical problem, the present document further provides a device for receiving enhanced transmission selection (ETS) configuration information, comprising a receiving module, a first analyzing module, a second analyzing module and a third analyzing module, wherein:

the receiving module is configured to: receive Link Layer Discovery Protocol (LLDP) packets, wherein the LLDP packets use the ETS recommended TLV format;

the first analyzing module is configured to analyze a first field in the LLDP packets, judge whether the value of each byte in the first field is within a preset range or not;

the second analyzing module is configured to: when the first analyzing module determines that the value of each byte in the first field is within the preset range, analyze the value of the first segment of bits of each byte in the first field, and determine the scheduling algorithm used by internal priorities of a traffic class corresponding to each byte in the first field according to the value of the first segment of bits;

the third analyzing module is configured to: analyze the value of the second segment of bits of each byte in the first field, determine an additional parameter corresponding of the priority.

Preferably, the first analyzing module is configured to: judge whether the value of each byte in the first field is within a preset range or not, comprising:

the first analyzing module considers that the value of each byte in the transmission selection algorithm table field is within a preset range when determining that the value of each byte in the transmission selection algorithm table field meets the following conditions: the value of each byte in the Transmission Selection Algorithm table field is not equal to 255, and the value of the first segment bits in each byte in the transmission selection algorithm table field is no less than 3.

Preferably, the third analyzing module is configured to: analyze the value of the second segment of bits of each byte in the first field, and determine an additional parameter corresponding to the priority, comprising:

the third analyzing module analyzing the value of the second segment of bits of each byte in the transmission selection algorithm table field, and taking its value as the weight of the priority corresponding to each byte.

To solve the abovementioned technical problem, the present document further provides a device for transmitting enhanced transmission selection (ETS) configuration information, comprising a scheduling algorithm determining module and a scheduling algorithm parameter determining module, wherein:

the scheduling algorithm determining module is configured to: in a process of using an ETS recommended TLV format to generate Link Layer Discovery Protocol (LLDP) packets, determine a scheduling algorithm used by internal priorities of each traffic class, fill the identifier of the scheduling algorithm in the first segments of bits in the byte corresponding to the appropriate traffic class in the first field;

the scheduling algorithm parameter determining module is configured to: determine an additional parameter corresponding to the respective priority, and fill the additional parameter in the second segment of bits of the byte corresponding to the appropriate priority in the first field.

The method and device provided in the present application can guide the peer end in achieving a variety of weighted scheduling algorithms. By extending the transmission selection algorithm table field in the ETS recommended TLV, not only the scheduling mode of traffic classes can be represented, but also the relevant information needed by other algorithms, such as the weighted value needed by the weighted round-robin scheduling algorithm, can be carried. This application does not extend the number of bytes, only each byte is finely divided, or the information carried in the field is extended. The advantage is that if the peer end is achieved according to the standard, it can be very good at being compatible with the standard. In summary, the present application can not only be compatible with the standard, but also support the multi-scheduling algorithm.

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

The First Embodiment

Figure 1:
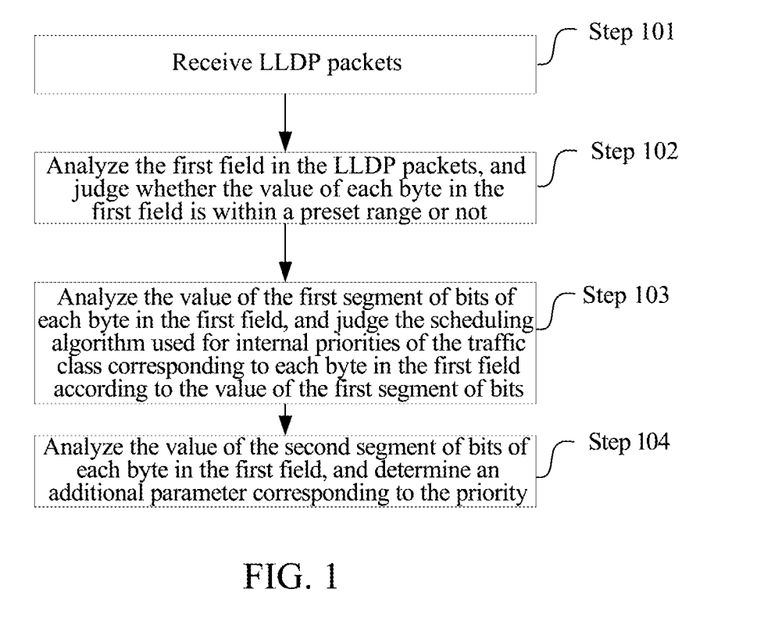
FIG. 1 is a flow chart of a receiving method in accordance with a first embodiment.

The present embodiment describes the method for receiving ETS configuration information, and as shown in FIG. 1, it comprises the following steps:

step 101, receive LLDP packets, wherein the LLDP packets is in the ETS recommended TLV format;

step 102, analyze the first field in the LLDP packets, and judge whether the value of each byte in the first field is within a preset range or not;

step 103 when determining that the value of each byte in the first field is within the preset range, analyze the value of the first segment of bits of each byte in the first field, and judge the scheduling algorithm used by internal priorities of the traffic class corresponding to each byte in the first field according to the value of the first segment of bits;

step 104, analyze the value of the second segment of bits of each byte in the first field, and determine an additional parameter corresponding to the priority.

After the device receiving the LLDP packets analyzes the packets, the analyzed-out recommended configuration can be used.

To be compatible with the existing technology, the abovementioned first field is the transmission selection algorithm table field. The first field can also be achieved by adding a new field.

If the first field is the transmission selection algorithm table field, judge whether the value of each byte in the first field is within a preset range or not, specifically comprising: considering that the value of each byte in the transmission selection algorithm table field is within the preset range if determining that the value of each byte in the transmission selection algorithm table field meets the following conditions: the value of each byte in the transmission selection algorithm table field is not equal to 255, and the value of the first segment of bits of each byte in the transmission selection algorithm table field is no less than 3. The present embodiment employs the reserved part of 3-254 in the protocol to support different traffic classes of the peer end using different internal priority scheduling algorithms, and sends the additional parameters related to the respective priorities to the peer end at the same time. The additional parameters may be, for example, the weights of the priorities, or different parameters according to different algorithms.

In one preferred embodiment, the first segment of bits comprises: 5 low bits. The second segment of bits comprises: 3 high bits, as shown in Table 5. In other embodiments, the abovementioned first and second segments of bits may be separately located in other fields.

TABLE 5

Division of the Transmission Selection Algorithm field

| 3 bits | 5 bits |
|---|---|
| Weight | Selection algorithm |

Figure 2:
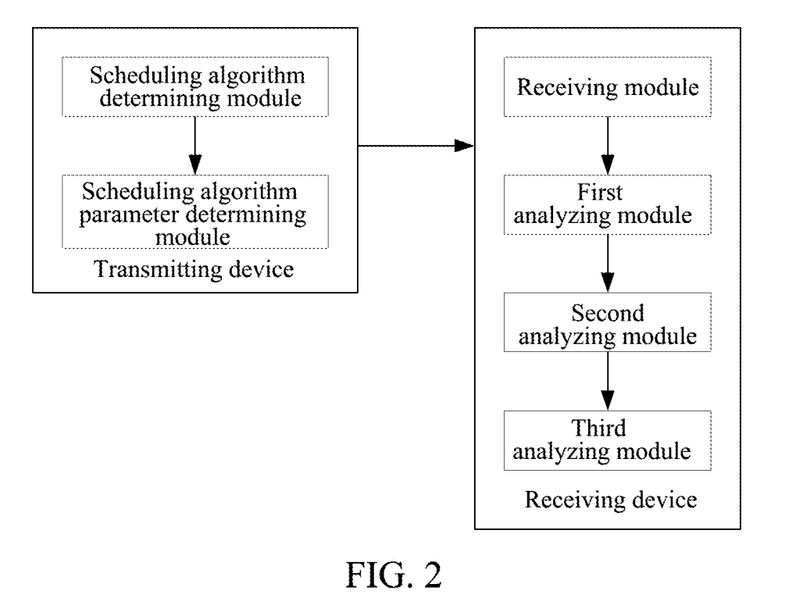
FIG. 2 is a schematic diagram of the device structure.

A device for implementing the abovementioned method is shown in FIG. 2, comprising a receiving module, a first analyzing module, a second analyzing module and a third analyzing module, wherein:

the receiving module is used to receive Link Layer Discovery Protocol (LLDP) packets, and the LLDP packets use the ETS recommended TLV format;

the first analyzing module is used to analyze the first field in the LLDP packets, judge whether the value of each byte in the first field is within a preset range or not;

the second analyzing module is used to: when the first analyzing module determines that the value of each byte in the first field is within the preset range, analyze the value of the first segment of bits of each byte in the first field, and determine the scheduling algorithm used for the priorities within the traffic class corresponding to each byte in the first field according to the value of the first segment of bits;

the third analyzing module is used to: analyze the value of the second segment of bits of each byte in the first field, and determine an additional parameter corresponding of the priority.

Preferably, the abovementioned first field is the Transmission Selection Algorithm Field.

In a preferred embodiment, the first analyzing module judges whether the value of each byte in the first field is within the preset range or not, comprising: the first analyzing module considers that the value of each byte in the transmission selection algorithm table field is within the preset range when determining that the value of each byte in the transmission selection algorithm table field meets the following conditions: the value of each byte in the Transmission Selection Algorithm table field is not equal to 255, and the value of the first segment bits of each byte in the transmission selection algorithm table field is no less than 3. The first segment of bits of each byte in the transmission selection algorithm table field comprises: 5 low bits of each byte in the transmission selection algorithm table field.

In a preferred embodiment, the third analyzing module analyzes the value of the second segment of bits of each byte in the first field, and determines an additional parameter corresponding to the priority, comprising: the third analyzing module analyzes the value of the second segment of bits of each byte in the transmission selection algorithm table field, and take its value as the weight of the priority corresponding to each byte. The second segment of bits of each byte in the transmission selection algorithm table field comprises: three high bits of each byte in the transmission selection algorithm table field.

The Second Embodiment

Figure 3:
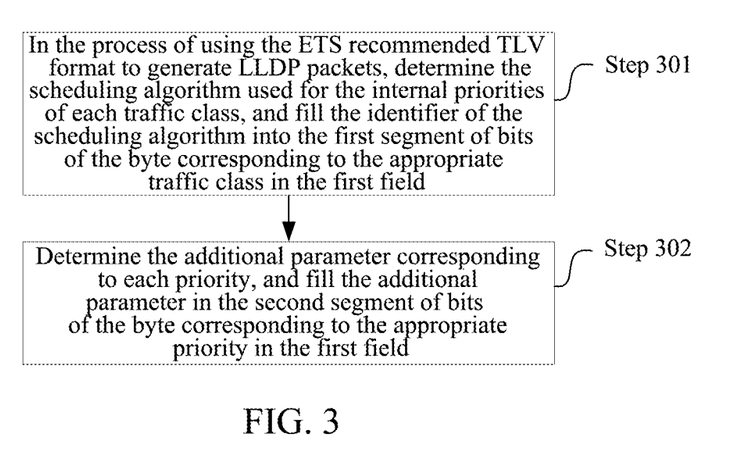
FIG. 3 is a flow chart of a transmitting method in accordance with a second embodiment.

The present embodiment describes the method for transmitting ETS configuration information, and as shown in FIG. 3, it comprises the following steps:

step 301, in the process of using the ETS recommended TLV format to generate LLDP packets, determine the scheduling algorithm used by the internal priorities of each traffic class, and fill the identifier of the scheduling algorithm into the first segment of bits of the byte corresponding to the appropriate traffic class in the first field;

step 302, determine the additional parameter corresponding to each priority (such as the weight of priority), and fill the additional parameter in the second segment of bits of the byte corresponding to the appropriate priority in the first field.

In a preferred embodiment, the first field is the transmission selection algorithm table field. The first segment of bits comprises: 5 low bits; the second segment of bits comprises: 3 high bits.

In a preferred embodiment, the range of the identifier of the scheduling algorithm is [3,254].

The device for implementing the abovementioned method is shown in FIG. 2, comprising a scheduling algorithm determining module and a scheduling algorithm parameter determining module, wherein:

the scheduling algorithm determining module is configured to: in the process of using the ETS recommended TLV format to generate Link Layer Discovery Protocol (LLDP) packets, determine the scheduling algorithm used by the internal priorities of each traffic class, and fill the identifier of the scheduling algorithm in the first segment of bits of the byte corresponding to the appropriate traffic class in the first field;

the scheduling algorithm parameter determining module is used to determine the additional parameter corresponding to the respective priority, and fill the additional parameter in the second segment of bits of the byte corresponding to the appropriate priority in the first field.

Hereinafter in conjunction with the application example, the abovementioned embodiment will be further described.

Application Example

In this example, two alternative scheduling algorithms are newly provided: weighted round robin scheduling algorithm (referred WRR) and Weighted deficits round robin (referred WDRR), and the Identifier values corresponding to these two algorithms are 20 and 21 respectively (see Table 6).

TABLE 6 newly added transmission selection algorithm description table

| Transmission selection algorithm | Identifier |
|---|---|
| Weighted round robin | 20 |
| Weighted deficits round robin | 21 |

Figure 4:
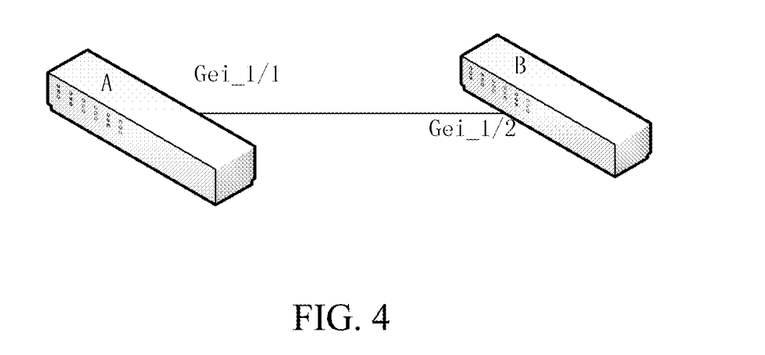
FIG. 4 is a schematic diagram of networking of an application example.

As shown in FIG. 4, the device A and the device B are connected, and both the device A and the device B support the ETS, and enable the LLDP and the ETS on the interface, the device A sends an ETS recommended TLV LLDP packet with the extension to the device B, and the specific data of the packet is: FE 19 00 80 C2 0A 00 55 54 43 33 00 00 00 00 28 3C 00 00 00 00 00 94 94 60 60 60 00 00 00 00 00 (hex);

the device B analyzes the LLDP packet after receiving it:

analyze the priority assignment table field (55 54 43 33), refer to table 3a, and know that the priorities of the traffic class 3 are 5,6,7, the priorities of the traffic class 4 are 3 and 4, and the priorities of the traffic class 5 are 0, 1 and 2;

analyze the TC bandwidth allocation table field (00 00 00 00 28 3C 00 00), refer to table 3b, and know that the bandwidth corresponding to the traffic class 3 is 0, the bandwidth corresponding to the traffic class 4 is 40 (101000), and the bandwidth corresponding to the traffic class 5 is 60 (111100);

analyze the transmission selection algorithm table field (00 00 00 94 94 60 60 60), refer to Table 3c, the field has a total of 8 bytes, determine that the value of each byte in this field is in the preset range ([3,254]), then analyze according to the method in the present application (otherwise process according to the prior art), and analyze out that both of the values of the five low bits of the bytes corresponding to the traffic classes 3 and 4 are 20 (10100), then determine that the internal priorities of the two traffic classes use the weighted round robin scheduling algorithm, since the priorities corresponding to the traffic classes 3 and 4 are 5,6,7 and 3,4 respectively, then analyze out that the three high bits of the byte corresponding to the appropriate priority of 3,4,5 6,7 in the transmission selection algorithm table field (in this case, the three high bits of each byte in Table 3c represent the weight of the respective priority, wherein: the three high bits of the byte 1 represent the weight of the priority 0, the three high bits of the byte 2 represent the weight of the priority 1, and so on) are respectively 4,4,3,3,3, representing the weights of the corresponding priorities, that is, the weights of the priorities 3 and 4 are 4, and the weights of the priorities 5, 6 and 7 are 3;

The successfully analyzed-out recommended configuration is used on the device B.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

Of course, the present document may also have other various embodiments, and without departing from the spirit and essence of the present document, a person skilled in the art can make appropriate changes and modifications in accordance with the present document, and these corresponding changes and modifications shall belong to the protection scope of the appended claims of the present document.

INDUSTRIAL APPLICABILITY

The method and device provided in the present application can guide the peer end in achieving a variety of weighted scheduling algorithms. By extending the transmission selection algorithm table field in the ETS recommended TLV, not only the scheduling mode of traffic classes can be represented, but also the relevant information needed by other algorithms, such as the weighted value needed by the weighted round-robin scheduling algorithm, can be carried. This application does not extend the number of bytes, only each byte is finely divided, or the information carried in the field is extended. The advantage is that if the peer end is achieved according to the standard, it can be very good at being compatible with the standard. In summary, the present application can not only be compatible with the standard, but also support the multi-scheduling algorithm.

What is claimed is:

1. A method for receiving enhanced transmission selection (ETS) configuration information, comprising:
   receiving, by a second Data Center Bridging (DCB) device, a Link Layer Discovery Protocol (LLDP) packet sent from a first DCB device, wherein the LLDP packet is in an ETS recommended type-length-value (TLV) format;
   analyzing, by the second DCB device, a transmission selection algorithm (TSA) table field in the LLDP packet, judging, by the second DCB device, whether a value of each of bytes in the TSA table field is within a preset range or not, wherein the bytes are bytes corresponding to traffic classes pre-obtained according to a priority assignment table field, and the bytes are obtained according to a TSA assignment table;
   when determining that the value of one byte in the TSA table field is within the preset range, analyzing, by the second DCB device, a value of m low bits of said one byte, wherein said one byte corresponds to one of the pre-obtained traffic classes; and determining, by the second DCB device a scheduling algorithm used by said one traffic class according to the value of the m low bits;
   analyzing, by the second DCB device, values of n high bits of bytes in the TSA table field, and determining, by the second DCB device, each of additional parameters corresponding to each of priorities of said one traffic class according to each value of n high bits of each of the bytes;
   wherein the bytes correspond to the priorities of said one traffic class, and the priorities of said one traffic class are obtained according to a priority assignment table;
   wherein m and n are integers and m+n=8; and
   after completing the analysis of the LLDP packet, using, by the second DCB device, a recommended configuration analyzed out, wherein the recommended configuration is the recommended TLV.

2. The method of claim 1, wherein,
   said judging whether the value of each of the bytes in the TSA table field is within the preset range or not comprises:

judging whether the value of each byte in the TSA table field meets the following conditions:
the value of each of the bytes in the TSA table field is not equal to 255, and the value of the m low bits of each of the bytes in the TSA table field is no less than 3.

3. The method of claim 2, wherein, m=5 and n=3.

4. The method of claim 1, wherein,
said analyzing values of n high bits of bytes in the TSA table field, and determining each of additional parameters corresponding to each of priorities of said one traffic class according to each value of n high bits of each of the bytes comprises:
analyzing the value of the n high bits of each of the bytes, and taking its value as a weight of the priority corresponding to the byte.

5. A method for transmitting enhanced transmission selection (ETS) configuration information, comprising:
in a process of using, by a first Data Center Bridging (DCB) device, an ETS recommended TLV format to generate a Link Layer Discovery Protocol (LLDP) packet, determining, by the first DCB device, a scheduling algorithm used for each of traffic classes which are pre-obtained according to a priority assignment table field, filling, by the first DCB device, an identifier of the scheduling algorithm into m low bits of one byte, which is corresponding to one of the pre-obtained traffic classes, in a transmission selection algorithm (TSA) table field;
determining, by the first DCB device, each of additional parameters corresponding to each of priorities of said one traffic class, and filling, by the first DCB device, each of the additional parameters into n high bits of each of bytes in the-TSA table field; wherein the bytes correspond to the priorities of said one traffic class, and the priorities of said one traffic class are obtained according to a priority assignment table;
wherein m and n are integers and m+n=8; and
sending, by the first DCB device, a recommended configuration to a second DCB device via the LLDP packet for the second DCB device to use the recommended configuration, wherein the recommended configuration is the recommended TLV.

6. The method of claim 5, wherein,
a range of the identifier of the scheduling algorithm is [3,254].

7. The method of claim 5, wherein, m=5 and n=3.

8. The method of claim 5, wherein,
each of the additional parameters is a weight of each of the priorities of said one traffic class.

9. A device for receiving enhanced transmission selection (ETS) configuration information, comprised in a second Data Center Bridging (DCB) device, the device for receiving ETS configuration information comprising hardware configured to execute instructions stored in a non-transitory computer readable medium to perform the following steps:
receiving a Link Layer Discovery Protocol (LLDP) packet sent from a first DCB device, wherein the LLDP packet is in an ETS recommended TLV format;
analyzing a transmission selection algorithm (TSA) table field in the LLDP packet, judging whether a value of each of bytes in the TSA table field is within a preset range or not, wherein the bytes are bytes corresponding to traffic classes pre-obtained according to a priority assignment table field, and the bytes are obtained according to a TSA assignment table;
determining that the value of one byte in the TSA table field is within the preset range, analyzing a value of m low bits of said one byte, wherein said one byte corresponds to one of the pre-obtained traffic classes; and determining a scheduling algorithm used by said one traffic class according to the value of the m low bits;
analyzing values of n high bits of bytes in the TSA table field, and determining each of additional parameters corresponding to each of priorities of said one traffic class according to each value of n high bits of each of the bytes; wherein the bytes correspond to the priorities of said one traffic class, and the priorities of said one traffic class are obtained according to a priority assignment table;
wherein m and n are integers and m+n=8; and
after completing the analysis of the LLDP packet, using a recommended configuration analyzed out, wherein the recommended configuration is the recommended TLV.

10. The receiving device of claim 9, wherein,
judging whether the value of each of bytes in the TSA table field is within the preset range or not comprises:
judging whether the value of each of the bytes in the transmission selection algorithm table field meets the following conditions: the value of each byte in the TSA table field is not equal to 255, and the value of the m low bits of each of the bytes in the TSA table field is no less than 3.

11. The receiving device of claim 10, wherein, m=5 and n=3.

12. The receiving device of claim 9, wherein,
analyzing values of n high bits of bytes in the TSA table field, and determining each of additional parameters corresponding to each of priorities of said one traffic class according to each value of n high bits of each of the bytes comprises:
analyzing the value of the n high bits of each of the bytes, and taking its value as a weight of the priority corresponding to the byte.

13. A device for transmitting enhanced transmission selection (ETS) configuration information, comprised in a first Data Center Bridging (DCB) device, the device for transmitting ETS configuration information comprising hardware configured to execute instructions stored in a non-transitory computer readable medium to perform the following steps:
in a process of using an ETS recommended TLV format to generate a Link Layer Discovery Protocol (LLDP) packet, determining a scheduling algorithm used for each of traffic classes which are pre-obtained according to a priority assignment table field, filling an identifier of the scheduling algorithm in m low bits of one byte, which is corresponding to one of the pre-obtained traffic classes, in a transmission selection algorithm (TSA) table field;
determining each of additional parameters corresponding to each of priorities of said one traffic class, and filling each of the additional parameters in n high bits of each of bytes in the TSA table field; wherein the bytes correspond to the priorities of said one traffic class, and the priorities of said one traffic class are obtained according to a priority assignment table;
wherein m and n are integers and m+n=8; and
sending a recommended configuration to a second DCB device via the LLDP packet for the second DCB device to use the recommended configuration, wherein the recommended configuration is the recommended TLV.

14. The transmitting device of claim 13, wherein,
a range of the identifier of the scheduling algorithm is [3, 254];
or m=5 and n=3;
or each of the additional parameters is a weight of each of the priorities of said one traffic class.

* * * * *